United States Patent
Zoricic et al.

(10) Patent No.: US 12,525,132 B2
(45) Date of Patent: Jan. 13, 2026

(54) DETECTION AND REPORTING OF AIRCRAFT DIVERSION EVENTS

(71) Applicant: The Boeing Company, Arlington, VA (US)

(72) Inventors: Marko Zoricic, Dreieich (DE); Andreas Sindlinger, Weinheim (DE); David Scarlatti, Madrid (ES)

(73) Assignee: The Boeing Company, Arlington, VA (US)

(*) Notice: Subject to any disclaimer, the term of this patent is extended or adjusted under 35 U.S.C. 154(b) by 168 days.

(21) Appl. No.: 18/455,900

(22) Filed: Aug. 25, 2023

(65) Prior Publication Data

US 2024/0161633 A1    May 16, 2024

(51) Int. Cl.
*G08G 5/22* (2025.01)
*G06Q 10/0631* (2023.01)
*G08G 5/26* (2025.01)
*G08G 5/56* (2025.01)

(52) U.S. Cl.
CPC ......... *G08G 5/22* (2025.01); *G06Q 10/06311* (2013.01); *G08G 5/26* (2025.01); *G08G 5/56* (2025.01)

(58) Field of Classification Search
CPC .. G08G 5/22; G08G 5/26; G08G 5/56; G06Q 10/06311
See application file for complete search history.

(56) References Cited

U.S. PATENT DOCUMENTS

| 9,640,079 | B1* | 5/2017 | Moravek | G08G 5/55 |
| 10,019,905 | B1 | 7/2018 | Kneuper et al. | |
| 2018/0144643 | A1* | 5/2018 | Moravek | B64D 43/00 |
| 2021/0027636 | A1* | 1/2021 | Dziecielski | G08G 5/26 |
| 2021/0183255 | A1 | 6/2021 | Van Tulder | |

FOREIGN PATENT DOCUMENTS

EP    3770883 A1    1/2021

* cited by examiner

*Primary Examiner* — Curtis A Kuntz
*Assistant Examiner* — James E Munion
(74) *Attorney, Agent, or Firm* — Joseph M. Butscher; The Small Patent Law Group LLC

(57) ABSTRACT

A method for detecting and reporting an aircraft diversion event includes receiving a continuous real-time surveillance stream via a server from a real-time surveillance system. The surveillance stream describes respective flight trajectories a population of aircraft in a defined three-dimensional (3D) airspace. The method also includes accessing historical flight information, via a processor, regarding past flight trajectories in the 3D airspace, and accessing navigation data. Additionally, the method includes calculating, via the server using the surveillance stream, historical flight information, and navigation data, at least one probability of diversion (POD) metric indicative of a probability that a subject aircraft in the population of aircraft is experiencing the aircraft diversion event. The method includes transmitting a diversion alert signal to one or more user devices when the POD metric exceeds a calibrated POD threshold limit, the diversion alert signal being indicative of the aircraft diversion event.

17 Claims, 3 Drawing Sheets

DETECTION AND REPORTING OF AIRCRAFT DIVERSION EVENTS

CROSS-REFERENCE TO RELATED APPLICATIONS

This application claims the benefit of priority to European Patent Application No. EP22383105.8 filed on Nov. 16, 2022, which is hereby incorporated by reference in its entirety.

BACKGROUND

The present disclosure generally pertains to computer-based systems and methodologies for detecting and reporting real-time aircraft diversion events during aircraft flight operations.

Commercial flight operations require a close coordination of large numbers of flights across a wide geographical area. To that end, automated flight scheduling systems are used to plan flights based on flight origin and intended destination, weather conditions, estimated arrival times, estimated turn times, and other relevant factors. At times, e.g., due to inclement weather, maintenance requirements, or in-flight emergencies, an aircraft may be required to land at a destination airport other than that which was originally scheduled. Such aircraft diversion events can disrupt the scheduling of downstream flight operations, including scheduling of connecting aircraft and coordinating actions of ground personnel and other individuals who might be awaiting the arrival of a flight at the originally-scheduled destination.

SUMMARY

The subject disclosure enables the real-time detection of aircraft diversion events, along with reporting or dissemination of such aircraft diversion events to a set of users. The users contemplated herein may include, by way of example and not of limitation, airlines, airport personnel, passengers, family, friends, or business associates awaiting the arrival of a passenger at the originally-scheduled destination, etc. Exemplary embodiments described herein pertain to commercial aircraft operations and related scheduling of passenger and/or cargo aircraft, with extensions to other possible mobile operations being possible within the scope of the disclosure.

As appreciated in the art, the need to execute an aircraft diversion event is typically decided during a flight by air traffic control (ATC) personnel and/or the aircraft's pilot. Thus, the pilot and ATC personnel are usually the only parties made aware of the diversion, with airlines, airports, and other interested parties informed situationally as communications permit. As a result, many users are often informed of the aircraft diversion event late in the process, and often well after the fact. The present disclosure addresses this problem by expediting the propagation of information related to flight diversion events, thereby providing a real-time alert system that allows users to quickly adapt their actions. For instance, the sooner an aircraft diversion event is made known to an airline, the sooner the airline can plan a responsive flight schedule and associated crew, fleet, and ground support assignments. Likewise, the sooner users are made aware that certain passengers or cargo will not arrive at the originally-scheduled destination as expected, the sooner such users are able to rearrange their activity to adapt to the revised schedule and arrival location. Diversion events could be aircraft-specific, or the diversion events could be considered over a wider geographic area, e.g., possibly triggering rescheduling of planned flights that are still on the ground.

In a possible embodiment, a method for detecting and reporting an aircraft diversion event includes receiving a continuous real-time surveillance stream via a server, the surveillance stream describing respective flight trajectories a population of aircraft in a defined three-dimensional (3D) airspace. The method also includes accessing historical flight information via the server, including past flight trajectories in the 3D airspace, and accessing navigation data from a navigation database via the server.

Additionally, the method in this embodiment includes calculating, via the server using the surveillance stream, the historical flight information, and the navigation data, at least one probability of diversion (POD) metric indicative of a probability that an aircraft in the population of aircraft is experiencing the aircraft diversion event, and then transmitting a diversion alert signal to one or more user devices when the POD metric exceeds a calibrated POD threshold limit.

Receiving the continuous real-time surveillance stream may include receiving a real-time latitude, longitude, altitude, origin, intended destination, and vertical speed of each respective aircraft of the population of aircraft. In one or more embodiments, accessing the navigation data may include receiving a distance-from-origin, a distance-to-intended destination, and a cumulative flown distance of each respective aircraft of the population of aircraft.

As aspect of the disclosure includes establishing a remote network connection between the server and a database of historical flight information, and thereafter extracting the historical flight information from the database of the historical flight information.

Calculating the at least one POD metric may include calculating an altitude-based POD metric and/or calculating a distance-based POD metric as a distance-from-origin or a distance-to-intended destination of the subject aircraft.

Calculating the at least one POD metric may also include calculating a plurality of POD metrics. Transmitting the diversion alert signal to the one or more user devices in such an implementation may occur when one of the plurality of POD metrics first exceeds the calibrated POD threshold limit.

The method in a possible embodiment includes automatically scheduling an action of an airport or airline support system in response to the diversion alert signal.

Another aspect of the disclosure includes a system configured for detecting and reporting an aircraft diversion event. The system may include a processor in communication with a continuous real-time surveillance system, a database of historical flight information, and a database of navigation data, and non-transitory memory on which is recorded an instruction set. Executing the instruction set by the processor causes the processor to perform the above-summarized method.

Another embodiment of the method for detecting and reporting an aircraft diversion event includes receiving a continuous real-time surveillance stream, via a server from a real-time surveillance system. The surveillance stream describes respective flight trajectories for a population of aircraft in a defined 3D airspace and includes a real-time latitude, longitude, altitude, origin, an intended destination, a distance-from-origin, a distance-to-intended destination, and a cumulative flow distance of each respective aircraft in the population of aircraft.

The method in this non-limiting embodiment includes accessing historical flight information from a database of historical flight information over a remote network connection, via a processor, with the historical flight information including past flight trajectories in the 3D airspace. Additionally, the method includes accessing navigation data from a navigation database, wherein the navigation data includes a distance-from-origin, a distance-to-intended destination, and a cumulative flown distance of the population of aircraft, and calculating, via the server using the surveillance stream and the historical flight information, at least one POD metric indicative of a probability that a subject aircraft in the population of aircraft is experiencing the aircraft diversion event. The method further includes transmitting a diversion alert signal to one or more user devices when the POD metric exceeds a calibrated POD threshold limit, the diversion alert signal being indicative of the aircraft diversion event.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
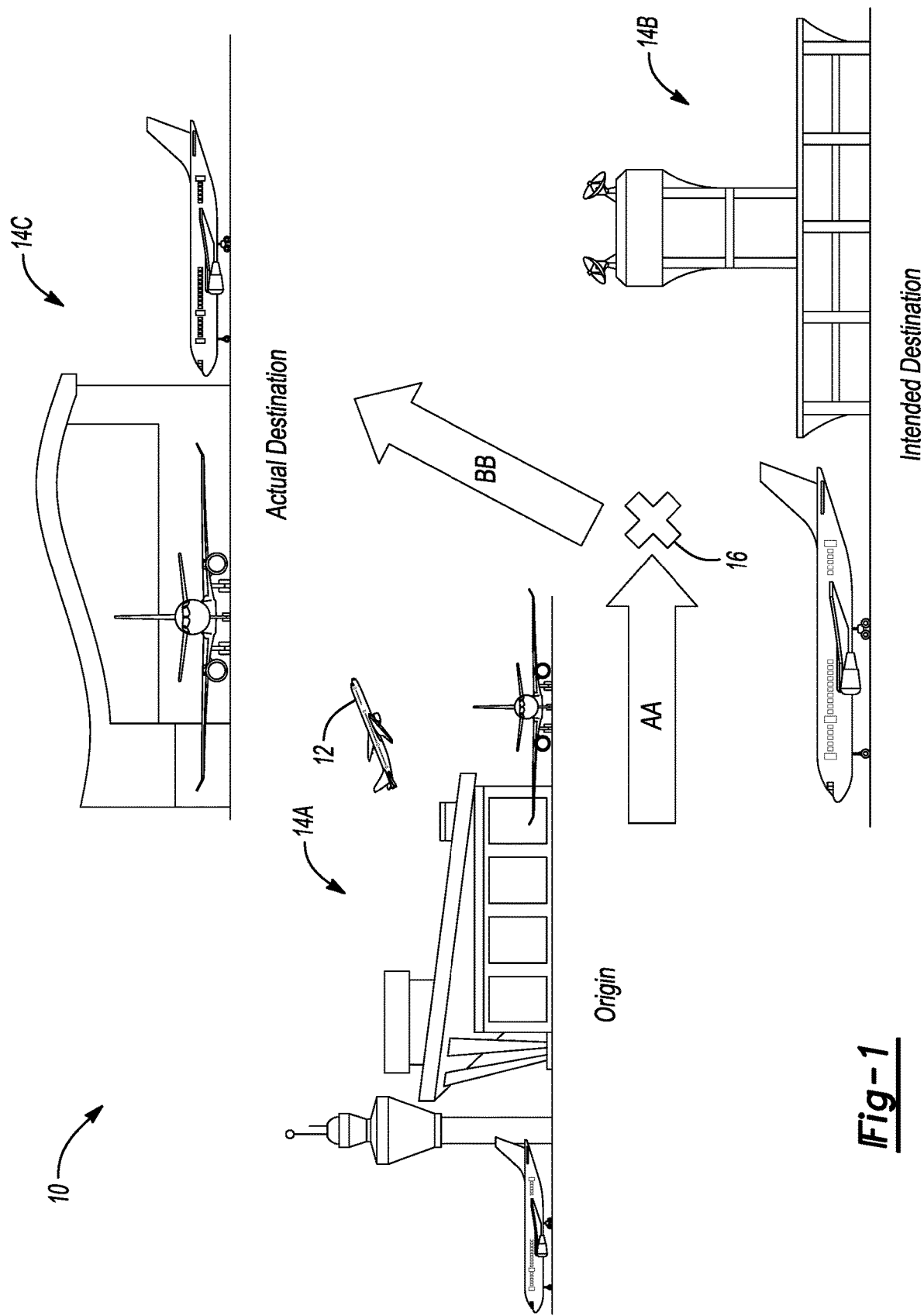
FIG. 1 illustrates a representative aircraft flight operation with an aircraft diversion event treated in accordance with the disclosure.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. It is to be understood, however, that the disclosed embodiments are merely examples, and that other embodiments can take various and alternative forms. The Figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to the drawings, wherein like reference numbers refer to the same or like components in the several Figures, a representative flight sequence 10 is shown in which an aircraft 12 departs from an origin 14A. While the present teachings can be extended to various other vehicles as noted above, the aircraft 12 will be described hereinafter as being an airplane, a helicopter, or another commercial passenger or cargo aircraft for illustrative simplicity and clarity.

After taking off, the aircraft 12 proceeds toward an intended destination 14B according to a planned route AA. Thus, users in the form of airlines, airport crew, passengers awaiting a connecting flight with the aircraft 12, family, friends, or business associates of passengers aboard the aircraft 12, etc., are present near or within the intended destination 14B. However, at a diversion point 16 located somewhere along the trajectory of the planned route AA, air traffic control (ATC) personnel or the pilot of the aircraft 12 may be required to change the flight plan due to factors such as weather, air traffic at the intended destination 14B, maintenance issues, or an in-flight emergency. In this situation, the aircraft 12 is required to travel to an actual destination 14C, with the trajectory of the diversion route BB. Thus, FIG. 1 presents in simplified form the concept of an aircraft diversion event. Such an event is detected and reported as set forth below with reference to FIGS. 2 and 3.

Figure 2:
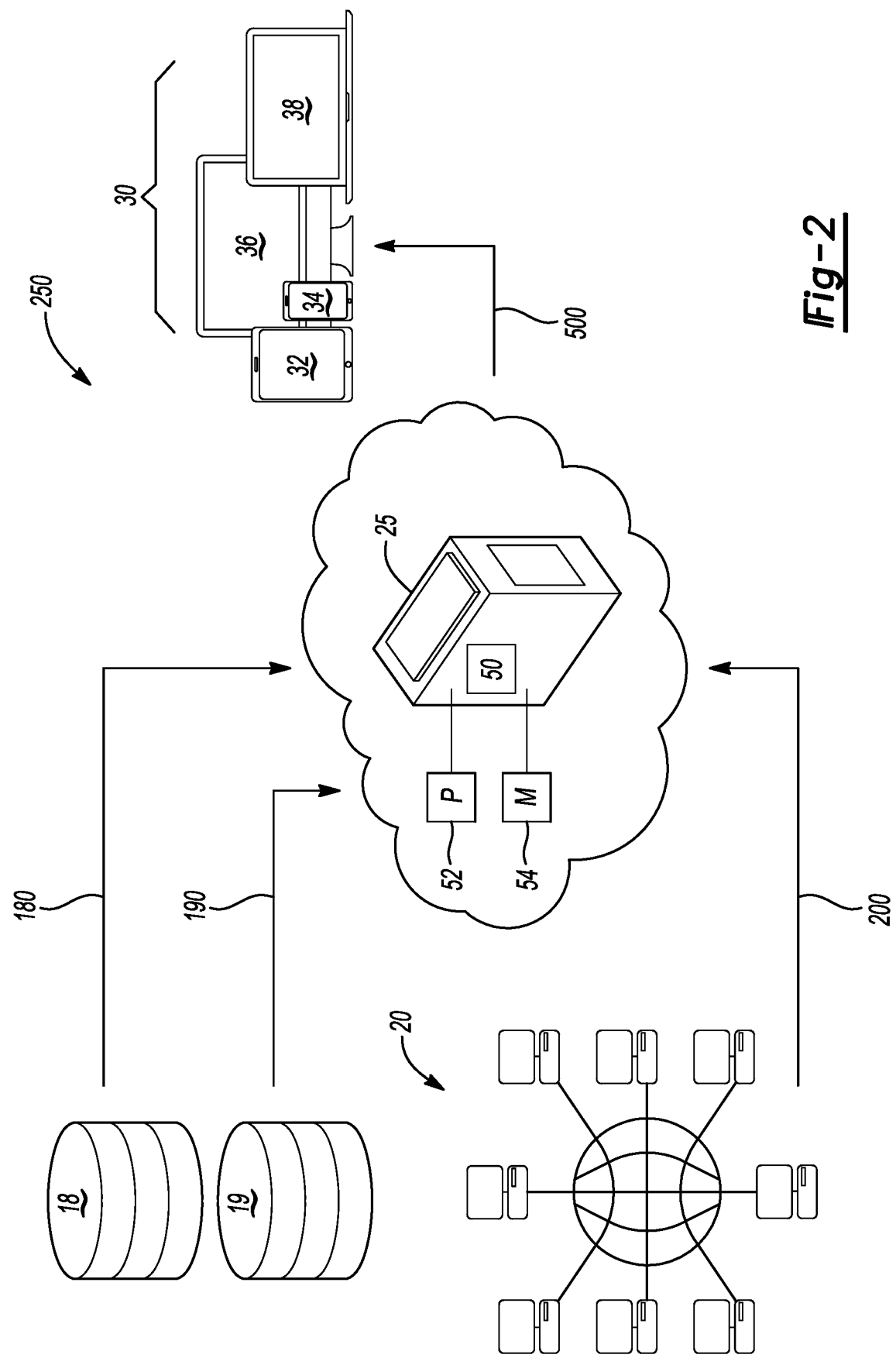
FIG. 2 is a schematic illustration of a system for detecting and reporting aircraft diversion events similar to the event depicted in FIG. 1.

Referring to FIG. 2, a computer system 250 as contemplated herein is operable for detecting and reporting aircraft diversion events, e.g., the representative aircraft diversion event depicted in FIG. 1. The computer system 250 includes a historical flight database 18, one or more real-time surveillance systems 20, and a server 25, e.g., a cloud-based server or computer network as shown. In some embodiments, the computer system 250 can also include a navigational database 19. The server 25 in turn is equipped with a processor (P) 52 and memory (M) 54, the latter including a non-transitory computer storage medium on which is recorded instructions embodying a method 50, with an exemplary embodiment of such a method 50 described in detail below with reference to FIG. 3.

The computer system 250 is configured to detect aircraft diversion events and provide near real-time alerts in advance of landing of the aircraft 12 while the aircraft 12 is in flight. Unlike existing approaches, the computer system 250 does not rely on air-to-ground or ground-based communications between ATC personnel, pilots, airlines, or airports for the purpose of initially gathering the relevant diversion information. Instead, the computer system 250 takes a global view of air traffic and detects singular aircraft diversion events as well as flight diversion patterns or trends more generally affecting a given geographic area and communicates alerts directly to a population of users.

As shown in FIG. 2, for example, the computer system 250 relies on several primary data sources in the performance of its programmed functions, including (1) the historical flight database 18, and (2) the real-time surveillance system(s) 20. As noted above, the computer system 250 may also rely on the navigational database 19 as another data source. With respect to the historical flight database 18, this component of the computer system 250 provides historical flight information 180. The historical flight database 18, also referred to herein as a database 18 of the historical flight information 180, could include a three-dimensional (3D) reference grid for every relevant city pair in a given geographic area, i.e., cities having a corresponding airport or suitable landing strip, with each cell of the 3D reference grid being populated with information about flights and altitudes/trajectories observed over a predetermined historical period, e.g., several weeks or months. The historical flight information 180 is thus indicative of past flight paths between multiple city pairs, e.g., Las Vegas-to-New York, Paris-to-Berlin, etc., possibly for different aircraft types or models.

With respect to the real-time surveillance systems 20, such systems provide real-time flight information for all flight in the same geographic area. For instance, the real-time surveillance systems 20 may output continuous real-time surveillance stream 200 in the form of latitude, longitude, altitude, aircraft model, origin, intended destination, and vertical speed. Satellite or radar-based information may be provided by any or all of, e.g., Flightradar24, FlightAware, the Federal Aviation Administration's Aircraft Situational Display to Industry (ASDI), etc. The navigational database 19 for its part may compute real-time navigation data 190 such as an intended destination, a distance-to-origin, a distance-to-destination, a cumulative flown distance, etc.

The real-time surveillance stream 200 may also include, or may be "fine-tuned" by, one or more transponder ("squawk") codes from the various aircraft whose flight paths traverse the various cells of the aforementioned grid. As appreciated in the art, such codes may be used to communicate status information including loss of communications, in-flight emergency, hijacking, etc. Thus, the real-time surveillance stream 200 identifies the location of the population of aircraft and corresponding trajectories and altitudes thereof.

The historical flight information 180 and the real-time surveillance stream 200 are communicated to or accessed by a server 25, e.g., one or more networked computer devices collectively or individually configured to execute computer-readable instructions embodying the present method. For clarity, the instruction set and the method are referred to herein as the method 50. The server 25 for its part executes the method 50 via a processor (P) 52 from non-transitory memory (M) 54 to perform the various diversion detection and reporting processes described below with reference to FIG. 3. Ultimately, the server 25 outputs a diversion alert signal 500 to one or more user devices 30 to disseminate the detected aircraft diversion events to a population of different users within the scope of the disclosure.

To this end, the server 25 may include one or more controllers, microcontrollers, control units, etc., in the form of various combinations of Application Specific Integrated Circuit(s) (ASIC), Field-Programmable Gate Array (FPGA), electronic circuit(s), central processing unit(s), with associated transitory and non-transitory memory/storage component(s) inclusive of the memory 54. The memory 54 may also include other non-transitory memory or tangible storage devices, e.g., read only memory, programmable read only memory, solid-state memory, random access memory, optical and/or magnetic memory, etc.

The memory 54, on which computer-readable instructions embodying the method 50 may be recorded, is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables.

Figure 3:
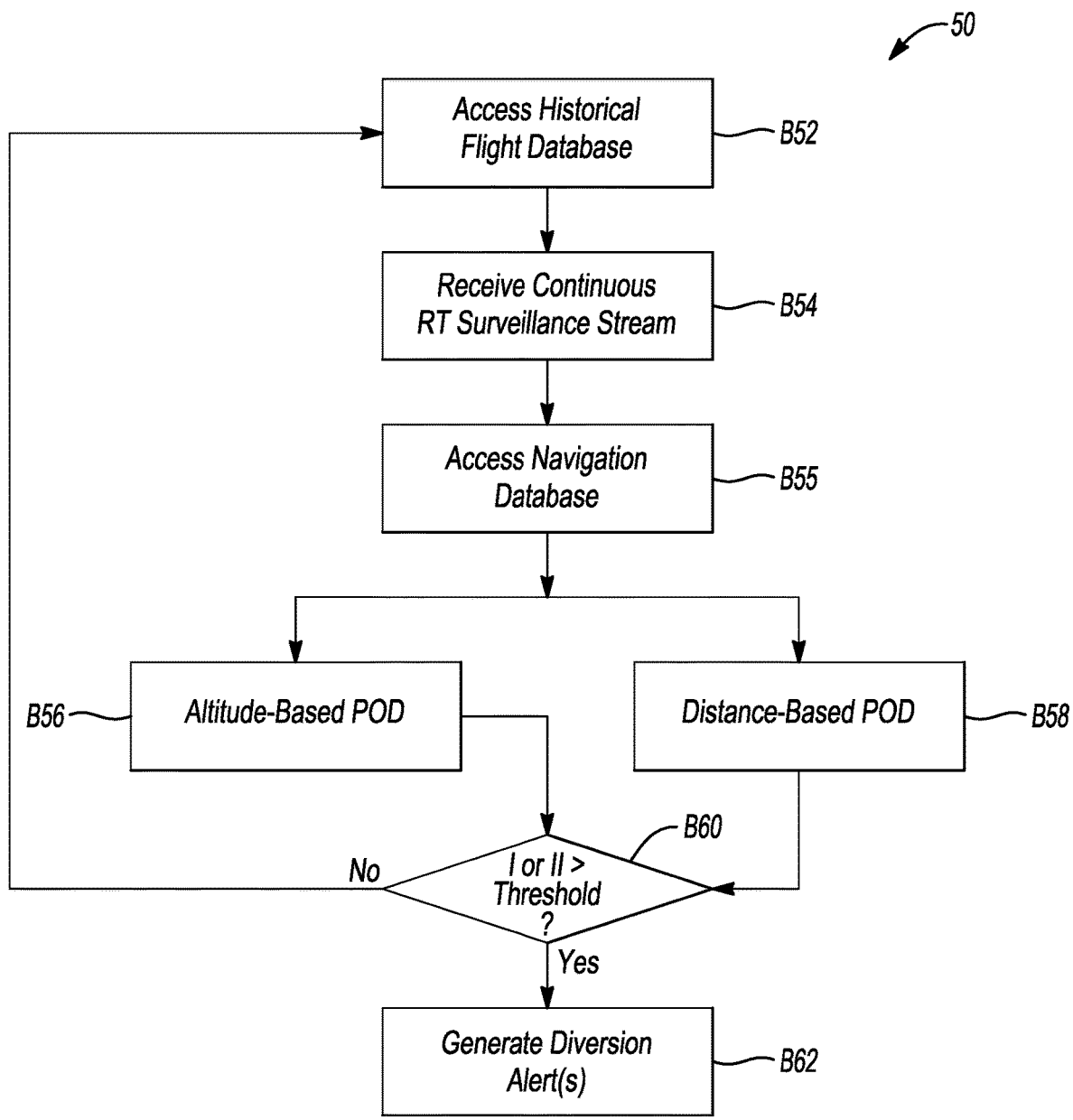
FIG. 3 is a flow chart describing a method for detecting and reporting aircraft diversion events according to a possible implementation.

Referring now to FIG. 3, an embodiment of the method 50 performed using components of the computer system 250 of FIG. 2 commences with logic block B52, with "block" as used herein referring to computer-implementable code, instructions, algorithms, or subroutines suitable for performing the indicated functions. Thus, execution of the various blocks by the processor 52 causes the processor 52 to perform the noted steps of the method 50. Here, the server 25 via processor 52 receives continuous real-time surveillance stream 200 from the various real-time surveillance systems 20 described above. The method 50 proceeds to logic block B54 as this occurs.

Logic block B54 may entail accessing the historical flight database 18 via the server 25 and retrieving or receiving the historical flight information 180 therefrom. The method 50 then proceeds to logic block B55.

Logic block B55 includes accessing the navigation database 19 via the server 25 and retrieving or receiving the navigation data 190 therefrom. The method 50 then proceeds to logic blocks B56 and B58.

At logic block B56, the server 25 performs an altitude-based detection process to detect diversion events based on altitude changes. That is, for each 3D position of an aircraft in a given cell, the server 25 computes at least one probability of diversion (POD) metric as a function of the various inputs. For example, with foreknowledge of the actual flight histories of same or similar aircraft models or tail codes, the server 25 of FIG. 2 could weigh a pattern of temporary or sustained variations from the expected routes to calculate a numeric metric. Such a metric could be a percentage value indicative of the likelihood that the aircraft's real-time flight behavior is indeed a true diversion to another airport, e.g., the actual destination 14C of FIG. 1, rather than being a temporary deviation that will ultimately still land at the intended destination 14B. The method 50 proceeds to block B60 when the POD metric has been ascertained.

At logic block B58, which is performed simultaneously with logic block B56, the server 25 performs a distance-to-destination detection process to detect diversion events based on the real-time variation of closing distance to a scheduled or intended destination. For each 3D position of an aircraft in a given cell, the server 25 computes a second probability of diversion (POD) metric as a function of the various inputs, this time based on distance rather than altitude changes. For instance, the server 25 may monitor the distance-to-destination continuously. When this distance increases over a threshold distance, a ratio to the total distance to destination may be used to detect that the aircraft 12 is no longer heading toward the intended destination 14B and is not likely to be indicative of a "non-direct" route to the intended destination 14B, e.g., due to weather or ATC limitations.

Other POD metrics may be calculated and used within the scope of the method 50, including for instance a distance-from-origin metric analogous to the distance-to-destination metric, in which the server 25 looks to the changing distance from the flight origin 14A relative to the expected distance of a non-diversionary flight trajectory as provided by the navigation data 190 of FIG. 2. The method 50 then proceeds to logic block B60.

Logic block B60 includes monitoring the outputs of logic blocks B56 and B58 in real-time to determine whether the altitude-based POD or one of the two or more possible distance-based PODs has exceeded a corresponding POD threshold. The method 50 proceeds to logic block B60 as soon as one of the detection processes returns a POD that exceeds its threshold.

At logic block B62 of FIG. 3, the server 25 may generate one or more aircraft diversion alerts in response to one or more of the above-described detection metrics/PODs first exceeding its corresponding threshold. Block B62 may include transmitting the diversion alert signal 500 of FIG. 2 to one or more of the user devices 30. For example, a particular user could be equipped with a tablet computer 32, a smart phone 34, a desktop computer 36, or a laptop computer 38 depending on the user and the user's relationship to the diverted flight or its passengers. Family or friends awaiting the arrival of a passenger of a diverted flight, for instance, may receive a text message or email on the smart phone 34 or any of the other user devices 30. Airlines and airports may receive the diversion alert signal 500 of FIG. 2 via a server or network of the airline/airport. Users are therefore quickly informed of diversion events well before the aircraft lands at its actual destination.

Downstream control actions may be taken in some instances in response to the diversion alert signal 500 depending on the configuration of the user device 30. For example, an airline or airport could, upon receipt of the diversion alert signal 500, automatically postpone or cancel a ground operation such as refueling, cleaning, crew assignment, etc., with foreknowledge of the likely non-arrival of the inbound flight. The diversion alert signal 500 could likewise trigger display of a diversion message on sign boards or message centers located throughout a passenger terminal of the intended destination 14B of FIG. 1. Control actions could include automatically scheduling an action of an airport or airline support system in response to the diversion alert signal 500, e.g., by scheduling connecting flights, ground transportation, baggage/luggage transfer, etc. Users could also take other actions, such as but not limited to canceling or rescheduling rental car or other ground transportation or flight reservations for passengers that will not arrive at the intended destination 14B.

As will be appreciated by those skilled in the art in view of the foregoing disclosure, the present teachings do not require or rely on communication between the user devices 30 of FIG. 2 and the airline, the airport, or the aircraft crew. Rather, the server 25 acts as an intermediary to independently calculate two or more different POD metrics using different sets of input data, i.e., the historical flight information 180 and the real-time surveillance stream 200. The method 50 then treats the first of the POD metrics to cross its corresponding threshold as a triggering event when transmitting the diversion alert signal 500 to one or more of the user devices 30. This approach results in the earlier detection of an aircraft diversion event, and thus affords users with additional time with which to respond in an appropriate manner. Other approaches may be contemplated within the scope of the disclosure, including possibly waiting until more than one or all of the POD metrics exceed their corresponding thresholds. Such implementations may result in higher levels of predictive accuracy, with the possible tradeoff of reducing the amount of advanced warning of the diversion event provided to the various users.

Additionally, those skilled in the art will appreciate that the method 50 may be applied to detection and reporting of discrete/singular diversion events as well as to detection and reporting of diversion events of a more global nature. That is, as the server 25 is informed of past and present flight status for each cell in a given airspace grid, flight diversion trends common to certain flight paths or aircraft types as opposed to specific aircraft may be quickly discerned via the method 50.

For example, a major weather event or airport closure could cause all inbound flights to a particular intended destination 14B (FIG. 1) to be diverted, possibly to the same or a different actual destination 14C. Thus, when a POD for an aircraft 12 traversing a given cell or cells in a particular flight path is high relative to a corresponding threshold, the diversion alert signal 500 may be preemptively transmitted to other users to convey diversion information for flights that might not have been diverted but that soon will be. These and other attendant benefits will be readily appreciated by those skilled in the art in view of the foregoing disclosure.

To assist and clarify the description of various embodiments, various terms are defined herein. Unless otherwise indicated, the following definitions apply throughout this specification (including the claims). Additionally, all references referred to are incorporated herein in their entirety. "A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The following Clauses provide example configurations of a method and system for detecting and reporting an aircraft diversion event as disclosed herein.

Clause 1: A method for detecting and reporting an aircraft diversion event, comprising: receiving a continuous real-time surveillance stream, via a server from a real-time surveillance system, wherein the surveillance stream describes respective flight trajectories for a population of aircraft in a defined three-dimensional (3D) airspace; accessing historical flight information, via the server, wherein the historical flight information includes past flight trajectories in the 3D airspace; accessing navigation data from a navigation database via the server; calculating, via the server using the surveillance stream, the historical flight information, and the navigation data, at least one probability of diversion (POD) metric indicative of a probability that a subject aircraft in the population of aircraft is experiencing the aircraft diversion event; and transmitting a diversion alert signal to one or more user devices when the POD metric exceeds a calibrated POD threshold limit, the diversion alert signal being indicative of the aircraft diversion event.

Clause 2: The method of clause 1, wherein receiving the continuous real-time surveillance stream includes receiving a real-time latitude, longitude, altitude, origin, intended destination, and vertical speed of each respective aircraft of the population of aircraft.

Clause 3: The method of any of clauses 1 or 2, wherein accessing the navigation data includes receiving a distance-from-origin, a distance-to-intended destination, and a cumulative flown distance of each respective aircraft of the population of aircraft.

Clause 4: The method of any of clauses 1-3, wherein receiving the historical flight information includes establishing a remote network connection between the server and a database of historical flight information, and thereafter extracting the historical flight information from the database of the historical flight information.

Clause 5: The method of any of clauses 1-4, wherein calculating the at least one POD metric includes calculating an altitude-based POD metric.

Clause 6: The method of any of clauses 1-5, wherein calculating the at least one POD metric includes calculating a distance-based POD metric as a distance-from-origin or a distance-to-intended destination of the subject aircraft.

Clause 7. The method of any of clauses 1-6, wherein calculating the at least one POD metric includes calculating a plurality of POD metrics, and wherein transmitting the diversion alert signal to the one or more user devices occurs when any one of the plurality of POD metrics first exceeds the calibrated POD threshold limit.

Clause 8. The method of any of clauses 1-7, further comprising: automatically scheduling an action of an airport or airline support system in response to the diversion alert signal.

Clause 9. A system configured for detecting and reporting an aircraft diversion event, comprising: a processor in communication with a continuous real-time surveillance system, a database of historical flight information, and a database of navigation data; and non-transitory memory on which is recorded an instruction set, wherein executing the instruction set by the processor causes the processor to: receive a continuous real-time surveillance stream from the real-time surveillance system, the continuous real-time surveillance stream including respective past flight trajectories for a population of aircraft in a defined three-dimensional (3D) airspace; access historical flight information from the database of historical flight information regarding past flight trajectories in the 3D airspace; access navigation data from the navigation database; calculate, using the continuous real-time surveillance stream, the historical flight information, and the navigation data, at least one probability of diversion (POD) metric indicative of a probability that a subject aircraft in the population of aircraft is experiencing the aircraft diversion event; and transmit a diversion alert signal to one or more user devices when the POD metric exceeds a calibrated POD threshold limit, the diversion alert signal being indicative of the aircraft diversion event.

Clause 10. The system of clause 9, wherein executing the instruction set by the processor causes the processor to receive, as the continuous real-time surveillance stream: a real-time latitude, longitude, altitude, origin, intended destination, and vertical speed of each respective aircraft of the population of aircraft.

Clause 11. The system of any of clauses 9 or 10, wherein executing the instruction set by the processor causes the processor to receive, as the navigation data: a distance-from-origin, a distance-to-intended destination, and a cumulative flown distance of the population of aircraft.

Clause 12. The system of any of clauses 9-11, wherein executing the instruction set by the processor causes the processor to establish a remote network connection with the database, and to thereafter extract the historical flight information from the database.

Clause 13. The system of any of clauses 9-12, wherein executing the instruction set by the processor causes the processor to calculate an altitude-based POD metric as at least part of the least one POD metric.

Clause 14. The system of any of clause 9-13, wherein executing the instruction set by the processor causes the processor to calculate a distance-based POD metric as at least part of the at least one POD metric, wherein the distance-based POD metric includes one or both of a distance-from-origin or a distance-to-intended destination of the subject aircraft.

Clause 15. The system of any of clauses 9-14, wherein executing the instruction set by the processor causes the processor to calculate a plurality of POD metrics, and to transmit the diversion alert signal to the one or more user devices when any one of the plurality of POD metrics first exceeds the calibrated POD threshold limit.

Clause 16. The system of any of clauses 9-15, wherein executing the instruction set by the processor causes the processor to automatically schedule an action of an airport or airline support system in response to the diversion alert signal.

Clause 17. A method for detecting and reporting an aircraft diversion event, comprising: receiving a continuous real-time surveillance stream, via a server from a real-time surveillance system, wherein the surveillance stream describes respective flight trajectories for a population of aircraft in a defined three-dimensional (3D) airspace and includes a real-time latitude, longitude, altitude, origin, an intended destination, a distance-from-origin, a distance-to-intended destination, and a cumulative flow distance of each respective aircraft in the population of aircraft; accessing historical flight information from a database of historical flight information over a remote network connection, via a processor, wherein the historical flight information includes past flight trajectories in the 3D airspace; accessing navigation data from a navigation database, wherein the navigation data includes a distance-from-origin, a distance-to-intended destination, and a cumulative flown distance of the population of aircraft; calculating, via the server using the surveillance stream and the historical flight information, at least one probability of diversion (POD) metric indicative of a probability that a subject aircraft in the population of aircraft is experiencing the aircraft diversion event; and transmitting a diversion alert signal to one or more user devices when the POD metric exceeds a calibrated POD threshold limit, the diversion alert signal being indicative of the aircraft diversion event.

Clause 18. The method of clause 17, wherein calculating the at least one POD metric includes calculating an altitude-based POD metric, a distance-from-origin POD metric, and a distance-to-intended destination of the subject aircraft.

Clause 19. The method of clause 18, wherein transmitting the diversion alert signal to the one or more user devices occurs when any one of the altitude-based POD metric, the distance-from-origin POD metric, and the distance-to-intended destination of the subject aircraft exceeds the calibrated POD threshold limit.

Clause 20. The method of clause 17, further comprising: automatically scheduling an action of an airport or airline support system in response to the diversion alert signal.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A method for detecting and reporting an aircraft diversion event, comprising:
    receiving a continuous real-time surveillance stream, via a server from a real-time surveillance system, wherein the surveillance stream describes respective flight trajectories for a population of aircraft in a defined three-dimensional (3D) airspace;
    accessing historical flight information, via the server, wherein the historical flight information includes past flight trajectories in the 3D airspace;
    accessing navigation data from a navigation database via the server;
    calculating, via the server using the surveillance stream, the historical flight information, and the navigation data, a first probability of diversion (POD) metric and a second POD metric, wherein the first POD metric and the second POD metric are indicative of a probability that a subject aircraft in the population of aircraft is experiencing the aircraft diversion event, wherein calculating the first POD metric comprises weighing a pattern of altitude variations from expected routes to create the first POD metric, and wherein calculating the second POD metric comprises determining a distance-to-destination continuously and using a ratio to the total distance-to-destination to detect that the subject aircraft is no longer heading toward an intended destination; and
    transmitting a diversion alert signal to one or more user devices when the first POD metric exceeds a first calibrated POD threshold limit or the second POD metric exceeds a second calibrated POD threshold limit, the diversion alert signal being indicative of the aircraft diversion event.

2. The method of claim 1, wherein receiving the continuous real-time surveillance stream includes receiving a real-time latitude, longitude, altitude, origin, the intended destination, and vertical speed of each respective aircraft of the population of aircraft.

3. The method of claim 1, wherein accessing the navigation data includes receiving a distance-from-origin, a distance-to-intended destination, and a cumulative flown distance of each respective aircraft of the population of aircraft.

4. The method of claim 1, wherein receiving the historical flight information includes establishing a remote network connection between the server and a database of the historical flight information, and thereafter extracting the historical flight information from the database of the historical information.

5. The method of claim 1, further comprising: automatically scheduling an action of an airport or airline support system in response to the diversion alert signal.

6. A system configured for detecting and reporting an aircraft diversion event, comprising:
    a processor in communication with a continuous real-time surveillance system, a database of historical flight information, and a database of navigation data; and
    non-transitory memory on which is recorded an instruction set, wherein executing the instruction set by the processor causes the processor to:
        receive a continuous real-time surveillance stream from the real-time surveillance system, the continuous real-time surveillance stream including respective past flight trajectories for a population of aircraft in a defined three-dimensional (3D) airspace;
        access historical flight information from the database of historical flight information regarding past flight trajectories in the 3D airspace;
        access navigation data from the navigation database;
        calculate, using the continuous real-time surveillance stream, the historical flight information, and the navigation data, a first probability of diversion (POD) metric and a second POD metric, wherein the first POD metric and the second POD metric are indicative of a probability that a subject aircraft in the population of aircraft is experiencing the aircraft diversion event, wherein the first POD metric is calculated by weighing a pattern of altitude variations from expected routes to create the first POD metric, and wherein the second POD metric is calculated by determining a distance-to-destination continuously and using a ratio to the total distance-to-destination to detect that the subject aircraft is no longer heading toward an intended destination; and
        transmit a diversion alert signal to one or more user devices when the first POD metric exceeds a first calibrated POD threshold limit or the second POD metric exceeds a second calibrated POD threshold limit, the diversion alert signal being indicative of the aircraft diversion event.

7. The system of claim 6, wherein executing the instruction set by the processor causes the processor to receive, as the continuous real-time surveillance stream: a real-time latitude, longitude, altitude, origin, the intended destination, and vertical speed of each respective aircraft of the population of aircraft.

8. The system of claim 6, wherein executing the instruction set by the processor causes the processor to receive, as the navigation data: a distance-from-origin, a distance-to-intended destination, and a cumulative flown distance of the population of aircraft.

9. The system of claim 6, wherein executing the instruction set by the processor causes the processor to establish a remote network connection with the database, and to thereafter extract the historical flight information from the database of the historical flight information.

10. The system of claim 6, wherein executing the instruction set by the processor causes the processor to automatically schedule an action of an airport or airline support system in response to the diversion alert signal.

11. A method for detecting and reporting an aircraft diversion event, comprising:

receiving a continuous real-time surveillance stream, via a server from a real-time surveillance system, wherein the surveillance stream describes respective flight trajectories for a population of aircraft in a defined three-dimensional (3D) airspace and includes a real-time latitude, longitude, altitude, origin, an intended destination, a distance-from-origin, a distance-to-intended destination, and a cumulative flow distance of each respective aircraft in the population of aircraft;

accessing historical flight information from a database of historical flight information over a remote network connection, via a processor, wherein the historical flight information includes past flight trajectories in the 3D airspace;

accessing navigation data from a navigation database, wherein the navigation data includes a distance-from-origin, a distance-to-intended destination, and a cumulative flown distance of the population of aircraft;

calculating, via the server using the surveillance stream and the historical flight information, a first probability of diversion (POD) metric and a second POD metric, wherein the first POD metric and the second POD metric are indicative of a probability that a subject aircraft in the population of aircraft is experiencing the aircraft diversion event, wherein calculating the first POD metric comprises weighing a pattern of altitude variations from expected routes to create the first POD metric, and wherein calculating the second POD metric comprises determining a distance-to-destination continuously and using a ratio to the total distance-to-destination to detect that the subject aircraft is no longer heading toward the intended destination; and transmitting a diversion alert signal to one or more user devices when the first POD metric exceeds a first calibrated POD threshold limit or the second POD metric exceeds a second calibrated POD threshold limit, the diversion alert signal being indicative of the aircraft diversion event.

12. The method of claim 11, further comprising: automatically scheduling an action of an airport or airline support system in response to the diversion alert signal.

13. The method of claim 1, wherein said calculating comprises calculating the first POD metric and the second POD metric simultaneously.

14. The method of claim 1, wherein the first POD metric is a percentage value indicative of a likelihood that a real-time flight behavior of the subject aircraft is a true diversion to another airport or a temporary deviation that will ultimately still land at an intended destination.

15. The system of claim 6, wherein the first POD metric and the second POD metric are calculated simultaneously.

16. The system of claim 6, wherein the first POD metric is a percentage value indicative of a likelihood that a real-time flight behavior of the subject aircraft is a true diversion to another airport or a temporary deviation that will ultimately still land at an intended destination.

17. The method of claim 11, wherein said calculating comprises calculating the first POD metric and the second POD metric simultaneously, wherein the first POD metric is a percentage value indicative of a likelihood that a real-time flight behavior of the subject aircraft is a true diversion to another airport or a temporary deviation that will ultimately still land at an intended destination.

* * * * *